(12) United States Patent
Wilcox

(10) Patent No.: US 7,232,099 B1
(45) Date of Patent: Jun. 19, 2007

(54) BRACKET FOR HOLDING ACCESSORIES ON A BOAT

(76) Inventor: Kenneth Wilcox, 401 Covina St., Riverside, OH (US) 45431-2225

( * ) Notice: Subject to any disclaimer, the term of this patent is extended or adjusted under 35 U.S.C. 154(b) by 242 days.

(21) Appl. No.: 10/928,237

(22) Filed: Aug. 27, 2004

(51) Int. Cl.
*G09F 7/18* (2006.01)

(52) U.S. Cl. .............................. 248/228.1; 248/228.5; 248/231.91; 43/21.2

(58) Field of Classification Search .............. 248/535, 248/540, 229.1, 229.14, 229.24, 227.4, 228.5, 248/231.61, 228.3, 228.1; 24/455, 486, 522; 43/21.2; 269/71, 74, 76, 79, 95, 907
See application file for complete search history.

(56) References Cited

U.S. PATENT DOCUMENTS

| | | | | | |
|---|---|---|---|---|---|
| 1,304,787 | A | * | 5/1919 | MacNeale | 248/231.61 |
| 1,462,505 | A | * | 7/1923 | Hunt | 182/201 |
| 3,753,359 | A | * | 8/1973 | Frey | 70/19 |
| 4,028,705 | A | * | 6/1977 | Loyd | 343/715 |
| 4,149,694 | A | * | 4/1979 | Verini | 248/539 |
| 4,298,771 | A | * | 11/1981 | Olashaw | 174/71 B |
| 4,341,375 | A | * | 7/1982 | Romanin | 269/43 |
| 4,367,858 | A | * | 1/1983 | Ziaylek, Jr. | 248/75 |
| 4,380,109 | A | * | 4/1983 | Pray | 29/466 |
| 4,528,768 | A | | 7/1985 | Anderson | |
| 4,760,986 | A | * | 8/1988 | Harrison | 248/231.61 |
| 4,844,208 | A | * | 7/1989 | Veness | 182/201 |
| 4,883,494 | A | * | 11/1989 | Cooper | 623/39 |
| 5,142,809 | A | * | 9/1992 | O'Brien et al. | 43/21.2 |
| 5,398,398 | A | * | 3/1995 | Williams et al. | 29/599 |
| 5,492,032 | A | * | 2/1996 | Hartman | 74/494 |
| 5,860,197 | A | * | 1/1999 | Fox | 24/522 |
| 6,405,985 | B1 | * | 6/2002 | Glebe | 248/291.1 |
| 6,498,859 | B2 | * | 12/2002 | Kuerti et al. | 381/361 |
| 6,561,736 | B1 | * | 5/2003 | Doleshal | 405/251 |
| 6,588,362 | B1 | | 7/2003 | Cope | |
| 6,591,541 | B1 | | 7/2003 | Cummings | |
| 6,643,973 | B1 | | 11/2003 | Smith | |

* cited by examiner

*Primary Examiner*—Korie Chan
(74) *Attorney, Agent, or Firm*—R. William Graham

(57) ABSTRACT

A bracket for holding accessories on a boat includes a pair of mounting plates which are laterally spaced apart from one another and interconnected by a plurality of threaded screws and wing nuts, wherein the mounting plates have a set of aligned open through surfaces through which the screws extend and are retained by the nuts. Connected between the plates to the screw are a set of interconnecting plates which form a slot therebetween to removably receive a support plate which is configured to attach to an accessory. Each screw has a plastic sleeve thereabout serving as a spacer between one of the mounting plates and the remaining interconnecting plates and wherein each spacer is approximately the width of a rail of a boat.

18 Claims, 6 Drawing Sheets

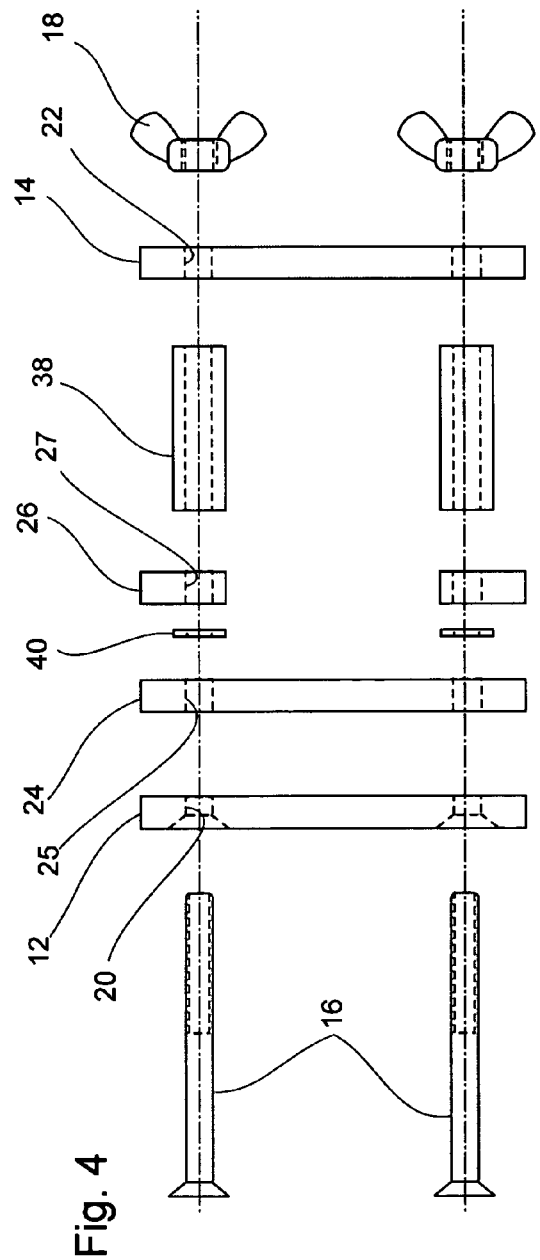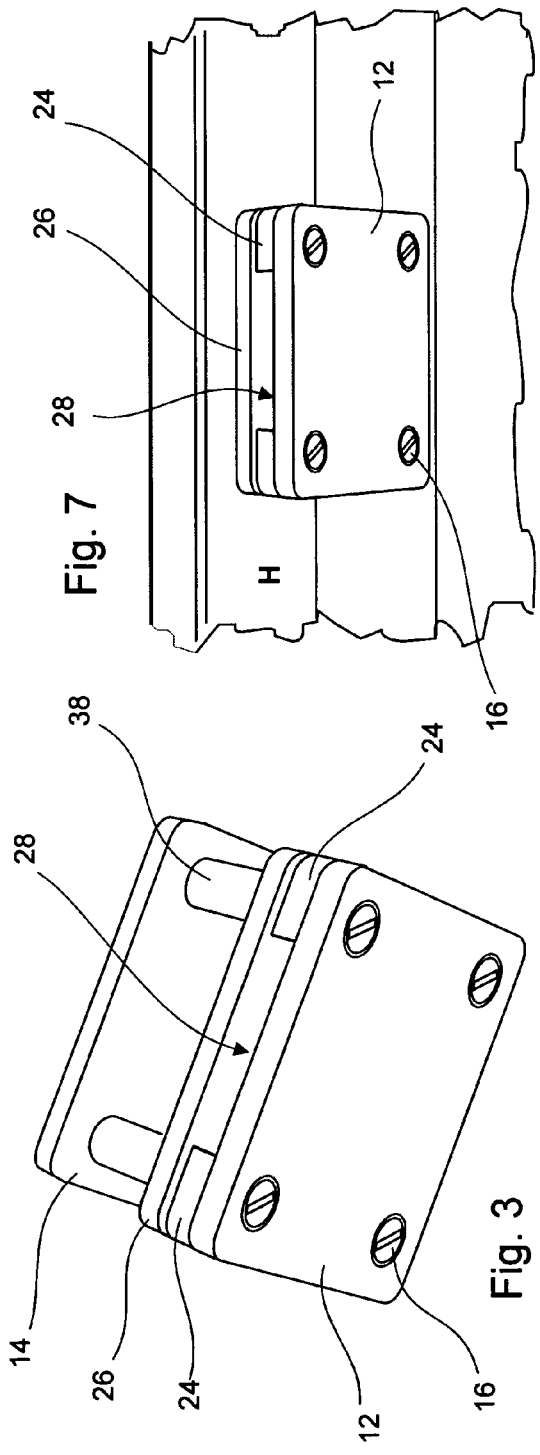

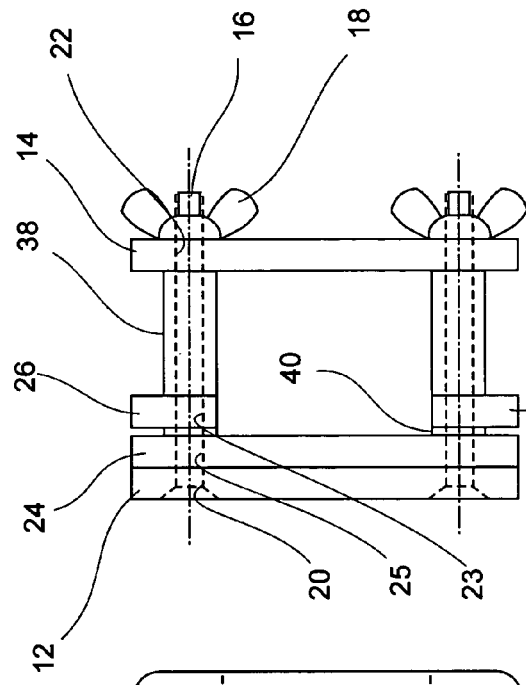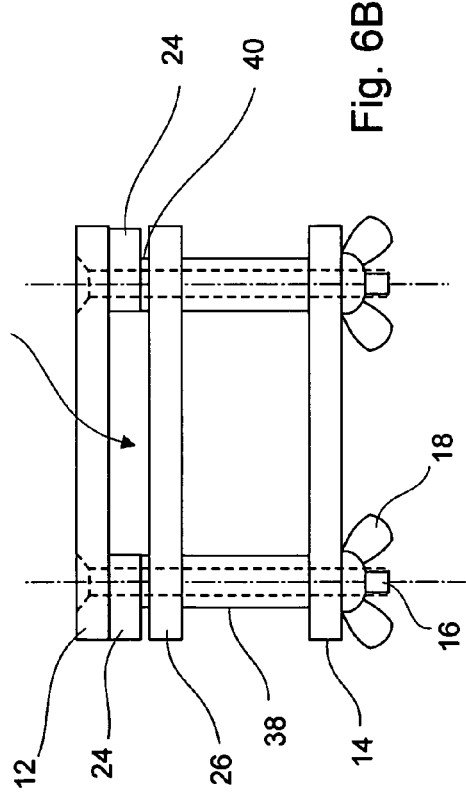

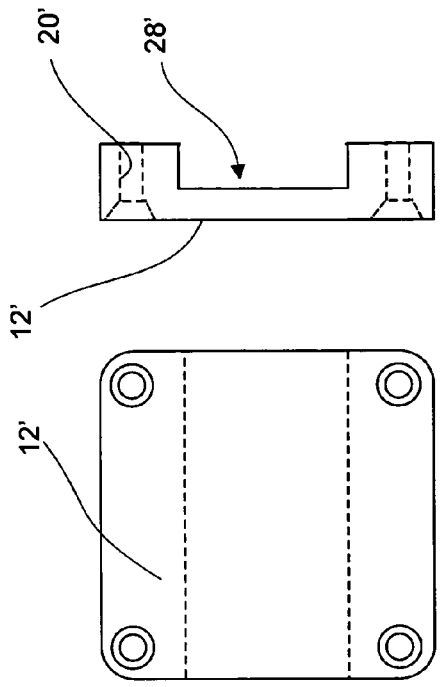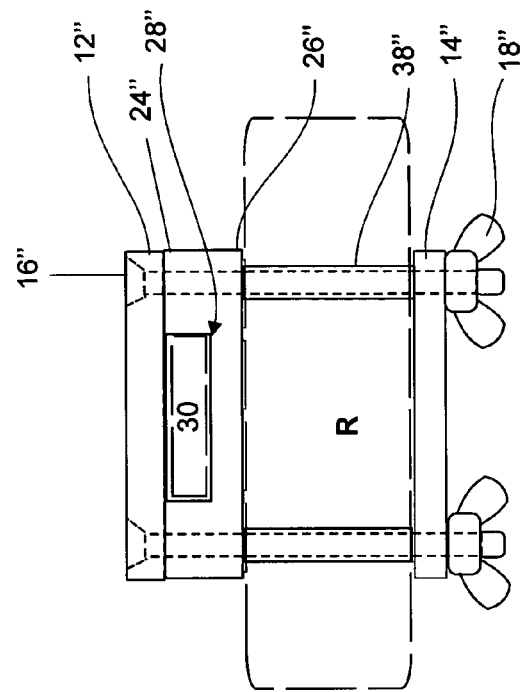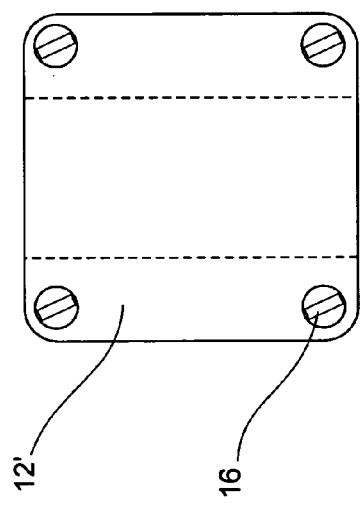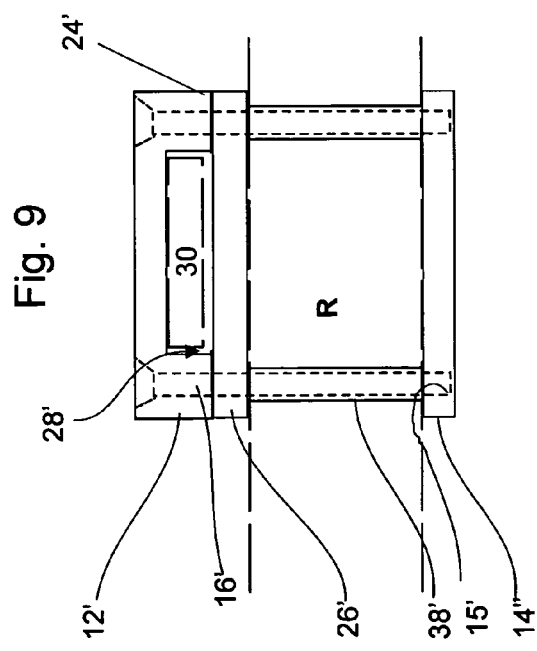

BRACKET FOR HOLDING ACCESSORIES ON A BOAT

BACKGROUND OF THE INVENTION

1. Field of the Invention

The present invention relates generally to holders and, more particularly, to a holder which for supporting a variety of accessories on a boat railing or boat side. The accessory holder of the invention includes a bracket for supporting a fishing rod, a table, depth meter, etc.

2. Description of the Prior Art

Boating is an activity which typically requires a significant portion of the day. While on a boat, there is often limited space for various items brought for a day's excursion. Fishing is often an activity accompanying boating. Accordingly, there are a number of fishing rod holders which exist to hold the rod while a person waits for a fish to bite. Prior fishing rod holders typically adapt to boat railing.

It is desirable to provide a multi-purpose holder for holding various accessories. It is also desirable to have a holder which permits a person to quickly change out holding such various accessories. Prior art does not teach or suggest a bracket for holding accessories which has the above desirable features as well as those apparent in the described invention herein. Other advantages of the present invention over the prior art also will be rendered evident.

SUMMARY OF THE INVENTION

It is an object to enhance boating experience.

It is a further object to enhance a boat's functionality.

It is an object to provide a bracket for holding an accessory on a boat.

It is still another object to provide a bracket which holds multiple accessories on a boat.

It is still a further object to provide a bracket which enables quick exchange of accessories on a boat.

Accordingly, the invention is directed to a bracket for holding accessories on a boat. The invention includes a pair of mounting plates which are laterally spaced apart from one another and interconnected by a plurality of threaded screws and wing nuts, wherein the mounting plates have a set of aligned open through surfaces through which the screws extend and are retained by the nuts. Connected between the plates to the screw are a set of interconnecting plates which form a slot therebetween to removably receive a support plate which is configured to attach to an accessory. Each screw preferably has a plastic sleeve about a portion thereof which serves as a spacer between one of the mounting plates and the remaining interconnecting plates and wherein each spacer is approximately the width of a rail of a boat. The sleeves provide some axial compression to permit tightening of the connected components to lock the mounting plate and support plate to the rail.

In a simplified embodiment, there is provided a bracket for holding accessories on a boat, which includes a mounting plate having a first side and a second side, a slotted exterior surface extending through the first side and defined by raised portions on either side thereof. Each of the raised portions has an open through surface therethrough. A plurality of connectors each has a head and a threaded end, wherein each one of the connectors extends through one of the open through surfaces such that the head seats adjacent the second side and the threaded end extends through the raised portion and connects to a side of the boat thus defining a slotted area between the boat side and the slotted surface. A support plate has a first end configured to be removably received and retained in the slotted area in a manner which provides a second end of the support plate to operably connect an accessory.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a perspective view of one part of an embodiment of the invention.

FIG. 4 is an exploded view of the part of FIG. 3.

FIG. 5 is an end view of the part of FIG. 3.

FIG. 6A is a side view of the part of FIG. 3.

FIG. 6B is another side view of the part of FIG. 3.

FIG. 7 is a perspective view of another part of another embodiment of the invention.

FIG. 8 is a side view of a part of another embodiment.

FIG. 9 is a top view of FIG. 8.

FIG. 10A is a top view of a part of another embodiment.

FIG. 10B is a side sectional view of the part in FIG. 10A.

FIG. 11 is an end view of a part of another embodiment.

DESCRIPTION OF THE PREFERRED EMBODIMENTS

Figure 1:
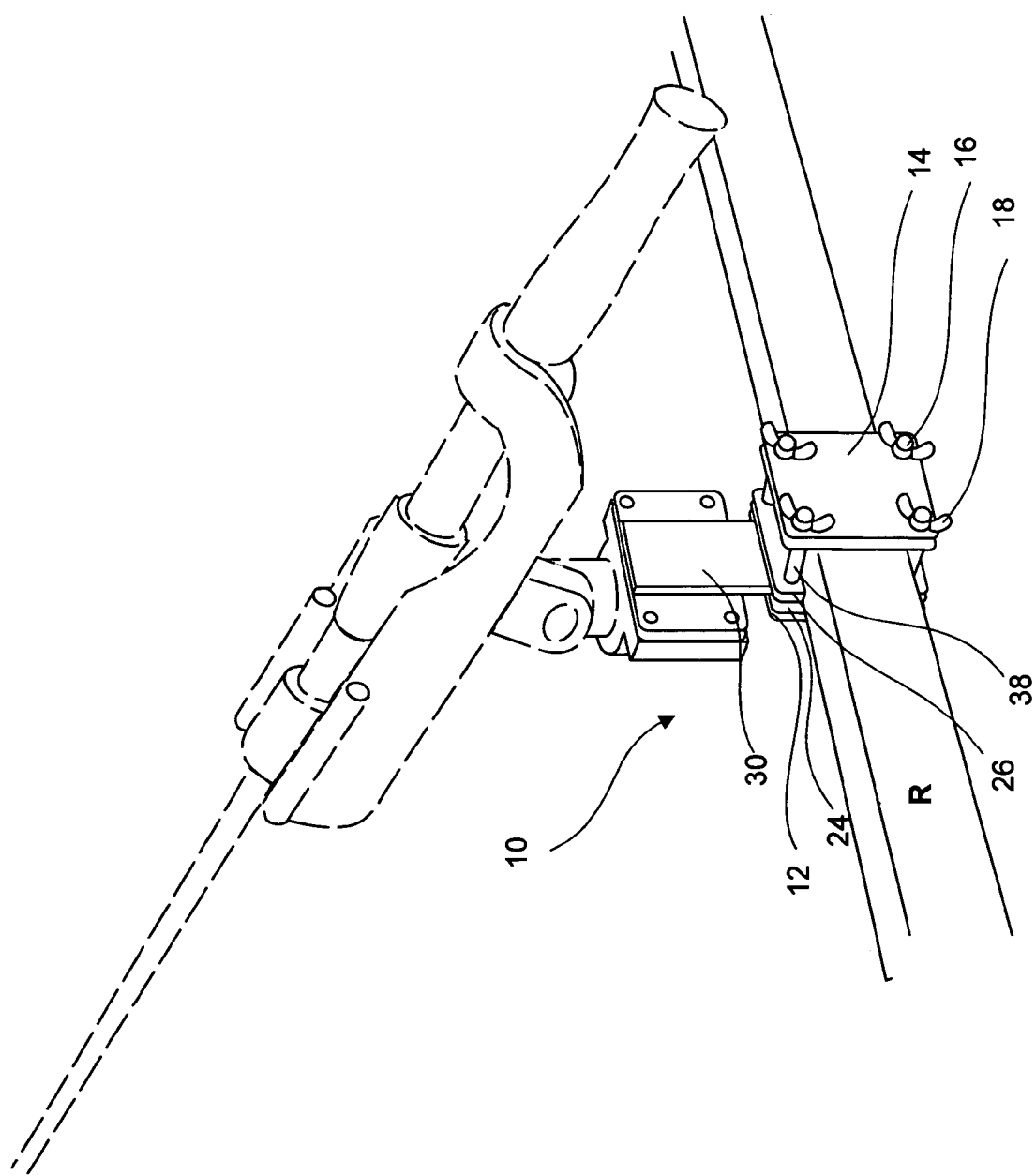
FIG. 1 is a perspective view of the invention in use.

Referring now to the drawings, a bracket for holding accessories on a boat is generally referred to by the numeral 10. The bracket 10 includes a pair of mounting plates 12 and 14 which are laterally spaced apart from one another and interconnected by a plurality of threaded screws 16 and wing nuts 18.

Figure 2:
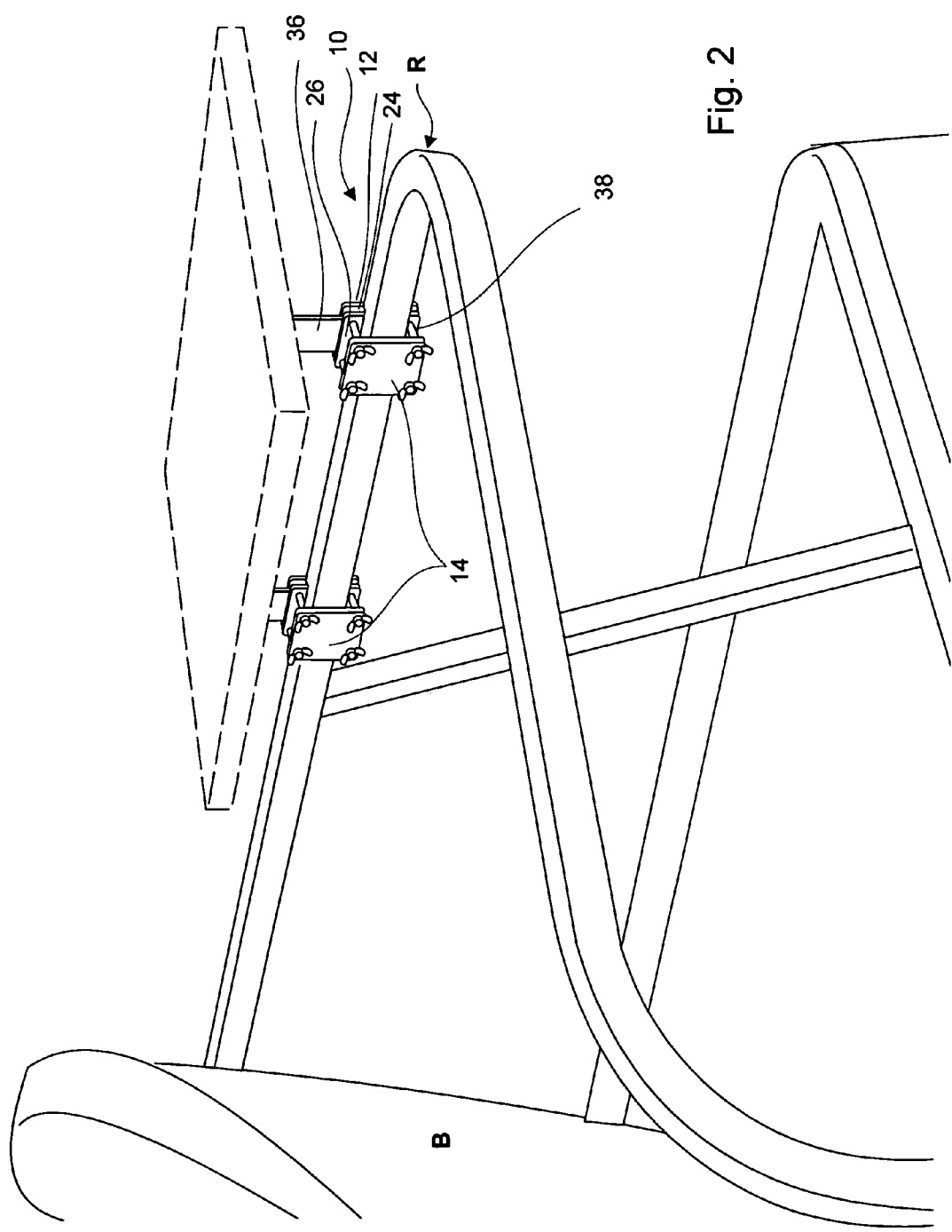
FIG. 2 is a perspective view of the invention in another mode of use.
Figure 14:
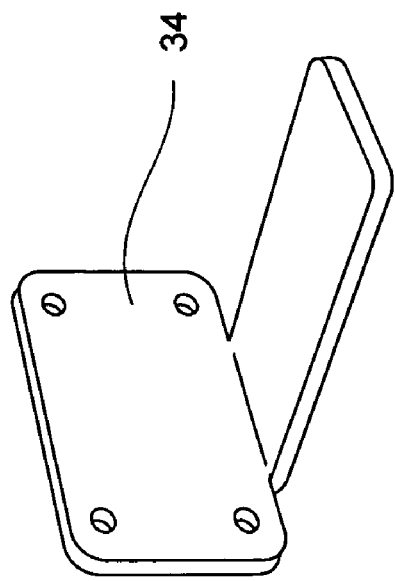
FIG. 14 is a perspective view of yet another support plate for use in the invention.
Figure 15:
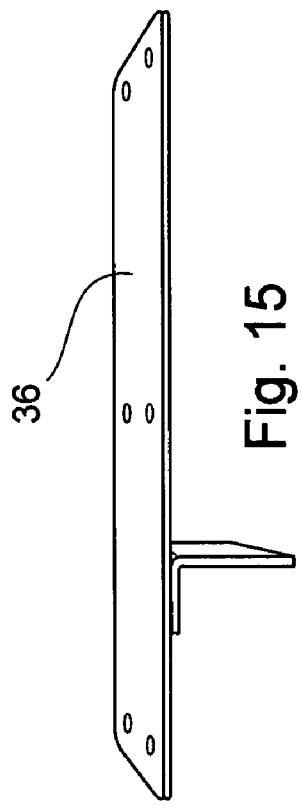
FIG. 15 is a perspective view of another support plate for use in the invention.
Figure 13:
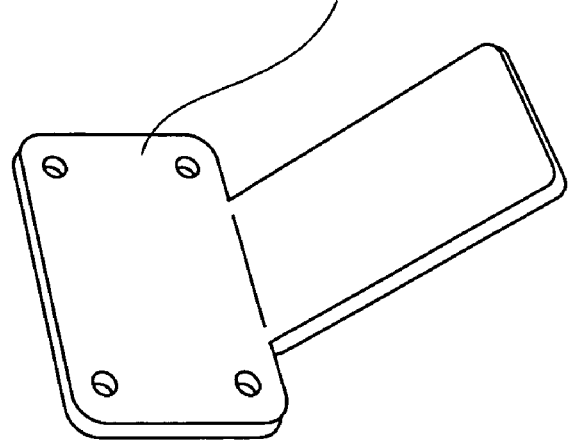
FIG. 13 is a perspective view of another support plate for use in the invention.
Figure 12:
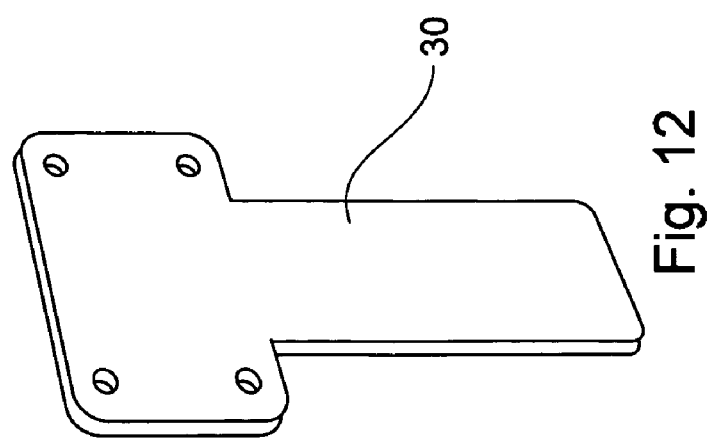
FIG. 12 is a perspective view of a support plate for use in the invention.

The mounting plates 12 and 14 have a set of aligned open through surfaces 20 and 22, respectively, through which the screws 16 extend and are retained by the wing nuts 18. As seen in the embodiment of FIGS. 4 and 6A and 6B, for example, connected between the mounting plates 12 and 14 to the screws 18 are a set of interconnecting plates 24 which form a slotted area 28 therebetween to removably receive support plate 30, 32, 34, or 36, as seen in FIGS. 12–15, which can be of a thickness approximate that of interconnecting plates 24. Interconnecting plates 24 and 26 include open through surfaces 25 and 27, respectively, which align with open through surfaces 20 and 22, respectively, to receive the screw therethrough. FIG. 1 depicts the use of support plate 30 whereas FIG. 2 depicts the use of support plate 36, for example, both of which are configured to attach to an accessory such as a fishing rod holder or a table. Modifications of this aspect of the invention are believed to be within the scope of the claims appended hereto.

Each screw 16 preferably has a sleeve 38, which can be of a suitable plastic, for example, which extends about a portion thereof and which serves as a spacer between one of mounting plate 14 and the interconnecting plates 26 and each sleeve 38 is approximately equal to the width of a rail R of a boat B as seen in FIG. 2, for example. The sleeves 38 are plastic preferably to permit slight compression and assure a tight fit connection to the rail R as seen in FIGS. 4 and 6A and 6B. Further, thin washers 40 are provided about the screws 16 between interconnecting plates 24 and 26 which also act spacers to provide additional slight clearance in the slotted area 28 for the insertion and removal of the support plates 30, 32, 34, or 36. In this embodiment, it is contemplated that all the plates 12, 14, 24, 26 and 30 can be machined from material having common stock thickness.

FIGS. 8 and 9 show an alternative embodiment, wherein the plates 24 described above can be integrally formed as part of plate 12, such that a new mounting plate 12' is formed with raised sides 24' with a slotted surface 28' formed therein as seen in FIGS. 10A–B. The raised sides 24' can be of a size such that when disposed against interconnecting plate 26' there is provided slight clearance for the insertion and removal of the support plates 30, 32, 34, or 36 as similarly described above. Thus, the need for the washers 40 are not needed in this embodiment, however, different thickness stock material is utilized. Further, plate 14' can be modified to include threaded openings 15' to provide for threading of the screws 16' directly thereto. Sleeve 38' can be similarly formed as described above for sleeve 38.

FIG. 11 shows yet another embodiment wherein the plates 24 and 26 have been integrally formed into plate 26" with raised portions 24". Here, sleeve 38" is disposed between plate 14" and plate 26" and can be similarly formed to that of plate 12'. Plate 12" can be similarly formed to that of plate 12 described hereinabove.

Another embodiment is shown in FIG. 7 wherein a direct mount to the boat hull H is depicted. Here, the use of plates 12, 24 and 26 and screws can be employed to hold one of the plates enable support of the support plates 30, 32, 34, or 36. Alternatively, plates 12' and plate 26' can be employed. It is readily conceived that other variations of these components or modifications thereof can be employed and should be covered by the claims appended hereto. The present invention provides a unique bracket for mounting to boats and boat railings, such as railing on pontoon boats.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A bracket for holding accessories on a boat rail, which includes:
    a first mounting plate having a first side and a second side, a slotted exterior surface extending through said first side and defined by raised portions on either side thereof, each of said raised portions having an opening therethrough;
    a second mounting plate is laterally spaced from said first mounting plate and includes a plurality of openings therethrough wherein each opening in said second mounting plate aligns with one of said openings in said first mounting plate;
    a third mounting plate disposed between said second mounting plate and said first mounting plate and includes a plurality of openings therethrough wherein each openings aligns with one of said openings in said first mounting plate;
    a plurality of connectors each having a head and an elongated end, wherein each one of said connectors extends through one of each said aligned openings such that said head seats adjacent said second side of said first plate and said elongated end extends through said aligned openings, wherein the boat rail is disposed between said second and third mounting plate and said connectors which when so connected retain said plates on the boat rail with said first mounting plate and third mounting plate adjacent one another thus defining a slotted area therebetween; and
    a support plate having a first end configured to be removably received and retained in said slotted area in a manner which provides a second end of said support plate to operably connect an accessory.

2. The bracket for holding accessories on a boat rail of claim 1, which further includes a spacer disposed between said third mounting plate and said second mounting plate.

3. The bracket for holding accessories on a boat rail of claim 2, which includes a plurality of spacers, wherein each said spacer is a sleeve having an opening therethrough to receive one of said connectors therethrough.

4. The bracket for holding accessories on a boat rail of claim 2, wherein said spacer is slightly flexible and of a length approximate to a size of the boat rail cross sectional size.

5. The bracket for holding accessories on a boat rail of claim 4, wherein said spacer is a sleeve having an opening therethrough to receive one of said connectors therethrough.

6. The bracket for holding accessories on a boat rail of claim 1, wherein each said connector includes a threaded screw and threaded nut.

7. The bracket for holding accessories on a boat rail of claim 1, wherein each connector includes a threaded screw and said openings in said second mounting plate are threaded.

8. The bracket for holding accessories on a boat rail of claim 1, wherein said slotted area is generally rectangular and said first end of said support plate is configured to be slidably received within said slotted area.

9. A bracket for holding accessories on a boat rail having a predetermined size cross section, which includes:
    a first mounting plate having a plurality of openings therethrough;
    a second mounting plate is laterally spaced from said first mounting plate and includes a plurality of openings therethrough wherein each opening of said second mounting plate aligns with one of said openings in said first mounting plate;
    a spacer plate having a slotted surface extending therethrough and defining side portions thereof, each of said side portions having an opening therethrough which aligns with one of said openings in said first mounting plate;
    a third mounting plate disposed between said spacer plate and said second mounting plate and includes a plurality of openings therethrough wherein each opening aligns with one of said openings in said first mounting plate;
    a plurality of connectors each having a head and an elongated end, wherein each one of said connectors extends through one of each said aligned openings such that said head seats adjacent an outer side of said first mounting plate and said elongated end extends through said aligned openings, wherein the boat rail is disposed between said second and third mounting plate and said connectors which when so connected retain said plates on the boat rail with said first mounting plate, said spacer plate and said third mounting plate adjacent interconnected to one another thus defining a slotted area therebetween; and a support plate having a first end configured to be removably received and retained in said slotted area in a manner which provides a second end of said support plate extending away from the boat rail and having means for operably connecting an accessory.

10. The bracket for holding accessories on a boat rail of claim 9, which further includes a spacer disposed between said third mounting plate and said second mounting plate.

11. The bracket for holding accessories on a boat rail of claim 10, which includes a plurality of spacers, wherein each said spacer is a sleeve having an opening therethrough to receive one of said connectors therethrough.

12. The bracket for holding accessories on a boat rail of claim 9, wherein said spacer is slightly flexible and of a length approximate to a size of the boat rail cross section size.

13. The bracket for holding accessories on a boat rail of claim 11, wherein said spacer is a sleeve having an opening therethrough to receive one of said connectors therethrough.

14. The bracket for holding accessories on a boat rail of claim 9, wherein each said connector includes a threaded screw and threaded nut.

15. The bracket for holding accessories on a boat rail of claim 9, wherein each connector includes a threaded screw and said openings in said second mounting plate are threaded.

16. The bracket for holding accessories on a boat rail of claim 9, wherein said slotted area is generally rectangular and said first end of said support plate is configured to be slidably received within said slotted area.

17. The bracket for holding accessories on a boat rail of claim 9, which further includes a thin clearance spacer disposed between said spacer plate and said third mounting plate.

18. The bracket for holding accessories on a boat rail of claim 17, wherein said clearance spacer includes a washer.

* * * * *